United States Patent
Hiroshi

(10) Patent No.: US 8,384,782 B2
(45) Date of Patent: Feb. 26, 2013

(54) APPARATUS AND METHOD FOR DISPLAYING BIRD'S EYE VIEW IMAGE OF AROUND VEHICLE TO FACILITATE PERCEPTION OF THREE DIMENSIONAL OBSTACLES PRESENT ON A SEAM OF AN IMAGE

(75) Inventor: Nakamura Hiroshi, Chiba (JP)

(73) Assignees: Hyundai Motor Japan R&D Center, Inc., Yokohama (JP); Kia Motors Corporation, Seoul (KR); Hyundai Motor Company, Seoul (KR)

( * ) Notice: Subject to any disclaimer, the term of this patent is extended or adjusted under 35 U.S.C. 154(b) by 436 days.

(21) Appl. No.: 12/570,613

(22) Filed: Sep. 30, 2009

(65) Prior Publication Data
US 2010/0220190 A1    Sep. 2, 2010

(30) Foreign Application Priority Data
Feb. 27, 2009   (JP) ................. 2009-045675

(51) Int. Cl.
*B60Q 1/00* (2006.01)
*G09G 5/00* (2006.01)
*H04N 5/228* (2006.01)
*H04N 9/47* (2006.01)

(52) U.S. Cl. ........ 348/148; 340/435; 345/629; 348/153; 348/222.1

(58) Field of Classification Search .......... 348/148, 348/153, 222.1; 340/435; 345/629
See application file for complete search history.

(56) References Cited

U.S. PATENT DOCUMENTS

| | | | |
|---|---|---|---|
| 5,646,679 A * | 7/1997 | Yano et al. | 348/47 |
| 5,777,690 A * | 7/1998 | Takeda et al. | 348/699 |
| 6,477,260 B1 * | 11/2002 | Shimomura | 382/106 |
| 6,535,114 B1 * | 3/2003 | Suzuki et al. | 340/435 |
| 6,817,741 B2 * | 11/2004 | Toda et al. | 362/466 |
| 6,853,738 B1 * | 2/2005 | Nishigaki et al. | 382/106 |
| 7,139,412 B2 * | 11/2006 | Kato et al. | 382/104 |
| 7,145,519 B2 * | 12/2006 | Takahashi et al. | 345/7 |
| 7,161,616 B1 * | 1/2007 | Okamoto et al. | 348/148 |
| 7,176,959 B2 * | 2/2007 | Sato et al. | 348/148 |
| 7,218,758 B2 * | 5/2007 | Ishii et al. | 382/104 |
| 7,277,559 B2 * | 10/2007 | Matsunaga et al. | 382/103 |
| 7,280,124 B2 * | 10/2007 | Laufer et al. | 345/629 |
| 7,295,229 B2 * | 11/2007 | Kumata et al. | 348/148 |
| 7,298,247 B2 * | 11/2007 | Shimizu | 340/435 |
| 7,317,813 B2 * | 1/2008 | Yanagawa et al. | 382/104 |
| 7,369,041 B2 * | 5/2008 | Nakanishi et al. | 340/435 |
| 7,511,734 B2 * | 3/2009 | Ozaki | 348/148 |
| 7,554,461 B2 * | 6/2009 | Edanami | 340/932.2 |
| 7,697,029 B2 * | 4/2010 | Ozaki | 348/148 |
| 7,728,879 B2 * | 6/2010 | Ishii | 348/222.1 |

(Continued)

FOREIGN PATENT DOCUMENTS

| | | |
|---|---|---|
| JP | 2002-324235 A | 11/2002 |
| KR | 10-2001-0098955 | 11/2001 |

(Continued)

*Primary Examiner* — Tonia L Dollinger
*Assistant Examiner* — Daniel C Murray
(74) *Attorney, Agent, or Firm* — Edwards Wildman Palmer LLP; Peter F. Corless

(57) ABSTRACT

The present invention features an apparatus and method for displaying a bird's eye view image of around a vehicle in a relatively simple manner without causing a large amount of processing load, in which a driver can easily perceive a three-dimensional obstacle placed adjacent to a seam.

7 Claims, 8 Drawing Sheets

U.S. PATENT DOCUMENTS

| | | | |
|---|---|---|---|
| 7,741,961 B1* | 6/2010 | Rafii et al. | 340/435 |
| 7,782,374 B2* | 8/2010 | Suzuki et al. | 348/239 |
| 7,920,056 B2* | 4/2011 | Hattori et al. | 340/441 |
| 2001/0019356 A1* | 9/2001 | Takeda et al. | 348/119 |
| 2003/0076414 A1* | 4/2003 | Sato et al. | 348/148 |
| 2004/0105579 A1* | 6/2004 | Ishii et al. | 382/154 |
| 2005/0152580 A1* | 7/2005 | Furukawa et al. | 382/103 |
| 2006/0078162 A1* | 4/2006 | Wonneberger | 382/103 |
| 2006/0088190 A1* | 4/2006 | Chinomi | 382/104 |
| 2006/0152351 A1* | 7/2006 | Luna et al. | 340/435 |
| 2007/0041659 A1* | 2/2007 | Nobori et al. | 382/284 |
| 2007/0085901 A1* | 4/2007 | Yang et al. | 348/47 |
| 2007/0120656 A1* | 5/2007 | Nakanishi et al. | 340/435 |
| 2007/0273554 A1* | 11/2007 | Sakakibara | 340/932.2 |
| 2007/0279493 A1* | 12/2007 | Edanami | 348/148 |
| 2008/0024607 A1* | 1/2008 | Ozaki | 348/148 |
| 2008/0143835 A1* | 6/2008 | Abe et al. | 348/148 |
| 2008/0186382 A1* | 8/2008 | Tauchi et al. | 348/148 |
| 2008/0211643 A1* | 9/2008 | Mohr et al. | 340/435 |
| 2008/0309763 A1* | 12/2008 | Hongo | 348/148 |
| 2009/0015675 A1* | 1/2009 | Yang | 348/148 |
| 2009/0073263 A1* | 3/2009 | Harada et al. | 348/148 |
| 2009/0122140 A1* | 5/2009 | Imamura | 348/148 |
| 2009/0169052 A1* | 7/2009 | Seki et al. | 382/103 |
| 2009/0268027 A1* | 10/2009 | Yang | 348/148 |
| 2009/0273674 A1* | 11/2009 | Russ et al. | 348/148 |
| 2009/0295922 A1* | 12/2009 | Mori | 348/148 |
| 2010/0060735 A1* | 3/2010 | Sato | 348/148 |
| 2010/0194886 A1* | 8/2010 | Asari et al. | 348/148 |
| 2010/0220189 A1* | 9/2010 | Yanagi | 348/148 |
| 2010/0245577 A1* | 9/2010 | Yamamoto et al. | 348/148 |
| 2010/0245578 A1* | 9/2010 | Kakinami | 348/148 |
| 2010/0259615 A1* | 10/2010 | Yamamoto | 348/148 |
| 2010/0271481 A1* | 10/2010 | Hongo | 348/148 |
| 2011/0001826 A1* | 1/2011 | Hongo | 348/148 |
| 2011/0063097 A1* | 3/2011 | Naka et al. | 340/435 |
| 2011/0157361 A1* | 6/2011 | Wu et al. | 348/148 |
| 2011/0169954 A1* | 7/2011 | Hongo | 348/148 |
| 2011/0169955 A1* | 7/2011 | Watanabe et al. | 348/148 |
| 2011/0216201 A1* | 9/2011 | McAndrew et al. | 348/148 |
| 2012/0002052 A1* | 1/2012 | Muramatsu et al. | 348/148 |
| 2012/0081542 A1* | 4/2012 | Suk et al. | 348/139 |

FOREIGN PATENT DOCUMENTS

| | | |
|---|---|---|
| KR | 10-2002-0004876 | 1/2002 |
| KR | 10-2003-0031445 A | 4/2003 |

* cited by examiner

APPARATUS AND METHOD FOR DISPLAYING BIRD'S EYE VIEW IMAGE OF AROUND VEHICLE TO FACILITATE PERCEPTION OF THREE DIMENSIONAL OBSTACLES PRESENT ON A SEAM OF AN IMAGE

CROSS-REFERENCE TO RELATED APPLICATION

This application claims under 35 U.S.C. §119(a) the benefit of Japanese Patent Application No. 2009-045675 filed Feb. 27, 2009, the entire contents of which are incorporated herein by reference

BACKGROUND OF THE INVENTION

1. Field of the Invention

The present invention relates, in general, to an apparatus and method for displaying a bird's eye view image of around a vehicle by converting images photographed by a plurality of cameras and then synthesizing the converted images. More particularly, the present invention relates to an apparatus and method for displaying a bird's eye view image, which facilitates perceiving a three-dimensional obstacle present on a seam of the image.

2. Description of the Related Art

As is well-known in the art, there are various methods of displaying situations around a vehicle using a bird's eye view which preferably make use of surrounding images that are photographed by a plurality of on-vehicle cameras. Specifically, these methods perform image conversion that include correction of distortion, change of viewpoint, and display area trimming on the surrounding images, and then suitably connect and synthesize the images into one continuous bird's eye view image.

However, a three-dimensional obstacle adjacent to the vehicle is displayed as a "completely-fallen image" on a bird's eye view and thus can be hardly discriminated from a shape on a road (e.g., a traffic sign). In particular, if a three-dimensional obstacle is suitably placed on or around a seam, three-dimensional images of the obstacle taken by adjacent cameras may be "completely fallen" in different directions and overlap each other. Accordingly, the obstacle is harder to perceive.

As an attempt to overcome this problem, Korean Patent Application Publication No. 2002-019556, incorporated by reference in its entirety herein, is directed to a technique that awakens a driver's attention by displaying a "completely-fallen" three-dimensional obstacle image on a seam of a bird's eye view image, when photographed in common by adjacent cameras, without smoothing (i.e., blending of) the seam. (Refer, for example, to FIG. 5 (C), described herein.)

According to this method, however, an important portion of the bird's eye view image is in a scattered state since the seam is not suitably smoothed. Accordingly, the perceptibility of the obstacle may be degraded.

In addition, as illustrated in FIG. 1 (A) through (E), Korean Patent Application Publication No. 2006-(12)1587, incorporated by reference in its entirety herein, discloses a technique that continuously or intermittently changes the position of seams 70 of a bird's eye view image, including a road 5 and the area surrounding a vehicle 20.

This technique requires the position of the seams to be changed in real-time even if an obstacle is not present around the vehicle, thereby increasing processing load as a drawback.

Further, Korean Patent Application Publication No. 2007-036668, incorporated by reference in its entirety herein, discloses optimally changing the position of a seam of a bird's eye view image on the horizon or the ground level by suitably determining the motion of the vehicle based on information from a steering angle sensor, a vehicle speed sensor, a shift position sensor, and the like. In this case, processing load increases since the change of the position of the seam is suitably required to be processed in real-time even if an obstacle is not present around the vehicle.

Korean Patent Application Publication No. 2007-041791, incorporated by reference in its entirety herein, discloses changing the position of a seam of a bird's eye view image on the horizon or the ground level when an on-vehicle sonar suitably detects an obstacle present on the seam of the bird's eye view image. Here, processing load further increases since the on-vehicle sonar must be equipped.

Accordingly, as described by above mentioned references, as the position of a seam moves, an image on one side of the seam suitably increases from the "completely-fallen shape," whereas an image on the other side of the seam suitably disappears from the top portion of the "completely-fallen shape." As a result, the perceptibility of an obstacle is not always improved.

Further, a three-dimensional obstacle suitably placed adjacent to a seam of a synthesized image may not be continuously connected on the seam, may be distorted even if connected on the seam, or may not be displayed at all. As a result, the perceptibility of the obstacle is not always improved.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides an apparatus and method for suitably displaying a bird's eye view image around a vehicle in a relatively simple manner without causing a large amount of processing load, in which a driver can easily perceive a three-dimensional obstacle placed adjacent to a seam.

According to a preferred embodiment of the present invention, an apparatus is provided for displaying a bird's eye view image. According to preferred embodiments of the invention, the apparatus may include a plurality of on-vehicle cameras photographing surrounding objects of a vehicle; an image-converting unit for suitably processing images obtained by the on-vehicle cameras, the image-converting unit preferably including unit for correcting lens distortion in each of images photographed by the on-vehicle cameras, unit for suitably converting a view point, unit for suitably trimming display areas, and unit for suitably synthesizing a bird's eye view image around the vehicle by connecting the trimmed display areas; and an on-vehicle display unit suitably displaying the synthesized bird's eye view image to a driver or an occupant. Preferably, the image-converting unit further includes a reference height-converting unit, which is suitably required to produce first through n+1$^{TH}$ bird's eye view images by sequentially drawing the second through n+1$^{TH}$ bird's eye view images for second through n+1$^{TH}$ reference heights, which are sequentially higher than ground level, indicated by a first reference height, where n is an integer greater than 0, in addition to drawing the bird's eye view image for the ground level.

The invention also preferably features a method for displaying a bird's eye view image. In preferred embodiments, the method may include the steps of: photographing surrounding objects of a vehicle using a plurality of on-vehicle cameras; suitably converting an image, wherein the image conversion preferably includes correcting lens distortion in each of the images photographed by the on-vehicle cameras, suitably converting a view point, trimming display areas, and suitably synthesizing and drawing a bird's eye view image around the vehicle by connecting the trimmed display areas; suitably displaying the bird's eye view image to a driver or an occupant using an on-vehicle display unit. Preferably, according to certain exemplary embodiments, the image conversion includes the step of suitably converting reference heights, which produces the first through $n+1^{TH}$ bird's eye view images by sequentially drawing the second through $n+1^{TH}$ bird's eye view images for second through $n+1^{TH}$ reference heights, which are sequentially higher than ground level indicated by a first reference height, preferably where n is an integer greater than 0, in addition to drawing the bird's eye view image for the ground level.

According to further preferred embodiments of the present invention, when a three-dimensional obstacle placed adjacent to a seam is suitably detected from a bird's eye view image of around a vehicle, a display area trimming can preferably be performed not only on the ground level (i.e., a first reference height) but preferably also one or more different limited reference heights, and a plurality of bird's eye view images obtained thereby can be suitably converted and displayed. Accordingly, the three-dimensional obstacle adjacent to the seam can be easily perceived.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other aspects, features and advantages of certain exemplary embodiments of the present invention will be more apparent from the following description taken in conjunction with the accompanying drawings, in which.

DETAILED DESCRIPTION OF THE INVENTION

The present invention provides, in one aspect, an apparatus for displaying a bird's eye view image, comprising a plurality of on-vehicle cameras photographing surrounding objects of a vehicle, an image-converting unit (or means) for processing images obtained by the on-vehicle cameras, and an on-vehicle display unit.

In one embodiments, the image-converting unit is selected from the group consisting of: unit for correcting lens distortion in each of images photographed by the on-vehicle cameras, unit for converting a view point, unit for trimming display areas, and unit for synthesizing a bird's eye view image around the vehicle by connecting the trimmed display areas.

In another embodiment, the on-vehicle display unit displays the synthesized bird's eye view image to a driver or an occupant.

In another further embodiment, the image-converting unit further includes a reference height-converting unit.

In still another embodiment, the reference height-converting unit is required to produce first through n+1TH bird's eye view images by sequentially drawing the second through n+1TH bird's eye view images for second through n+1TH reference heights, which are sequentially higher than ground level indicated by a first reference height, where n is an integer greater than 0, in addition to drawing the bird's eye view image for the ground level.

In another aspect, the invention features a motor vehicle comprising an apparatus for displaying a bird's eye view image as described in any one of the aspects herein.

In still another aspect, the invention features a method for displaying a bird's eye view image, comprising photographing surrounding objects of a vehicle using a plurality of on-vehicle cameras converting an image, displaying the bird's eye view image to a driver or an occupant.

In one embodiment, the image conversion is selected from the group consisting of: correcting lens distortion in each of the images photographed by the on-vehicle cameras, converting a view point, trimming display areas, and synthesizing and drawing a bird's eye view image around the vehicle by connecting the trimmed display areas.

In another embodiments, the bird's eye view image is displayed to a driver or an occupant using an on-vehicle display unit.

In still another embodiment, the image conversion includes converting reference heights to produce first through n+1TH bird's eye view images by sequentially drawing the second through n+1TH bird's eye view images for second through n+1TH reference heights, which are sequentially higher than ground level indicated by a first reference height, where n is an integer greater than 0, in addition to drawing the bird's eye view image for the ground level.

The present invention will now be described more fully hereinafter with reference to the accompanying drawings, in which exemplary embodiments thereof are shown.

Figure 1:
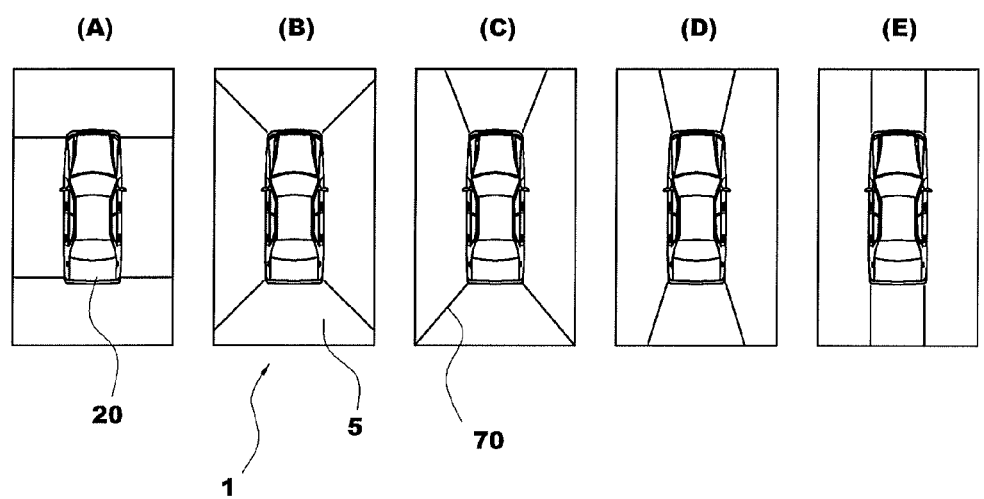
FIGS. 1A through 1E are bird's eye views illustrating locations of several seams in an image according to exemplary embodiments of the related art.
Figure 2:
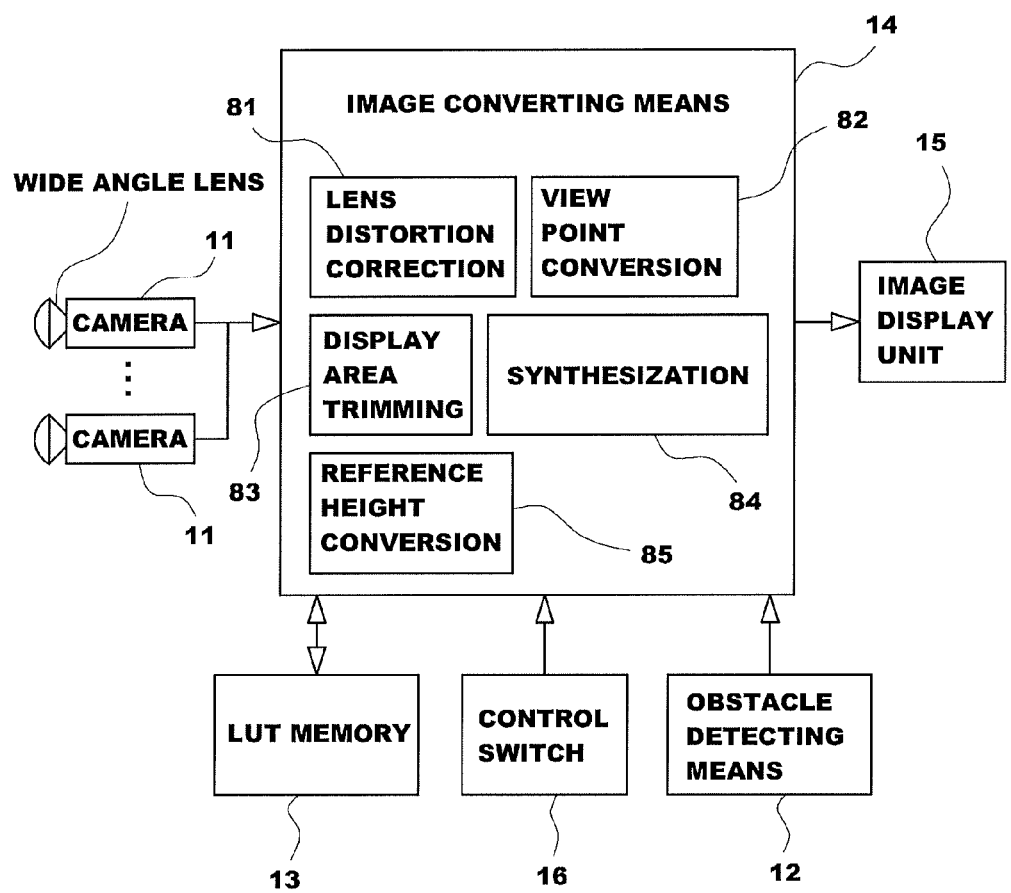
FIG. 2 is a block diagram illustrating a preferred apparatus for displaying a bird's eye view image of around a vehicle in accordance with one exemplary embodiment of the present invention.

According to preferred embodiments of the present invention, for example as shown in FIG. 2, FIG. 2 is a block diagram illustrating an apparatus for displaying a bird's eye view image of around a vehicle in accordance with one exemplary embodiment of the present invention.

Preferably, the apparatus of the present invention includes a plurality of on-vehicle cameras 11 suitably mounted on front, rear and side portions of a vehicle, an on-vehicle display unit 15, a control switch 16, image-converting unit 14 and memory 13.

According to certain preferred embodiments, the on-vehicle cameras 11 take pictures around the vehicle, and the on-vehicle display unit 15 suitably represents image information to a driver and an occupant. Preferably, the image-converting unit 14 draws a bird's eye view image from surrounding images of the vehicle by performing image conversion, where the image conversion preferably includes correction of distortion, change of viewpoint, and trimming of display areas on respective surrounding images photographed by the on-vehicle cameras 11, and suitably synthesizing the respective surrounding images by connecting the trimmed display areas. Preferably, the image-converting unit 14 also suitably draws the bird's eye view image by gradually converting a reference height, and displays the converted height on the on-vehicle display unit 15.

Preferably, the image-converting unit 14 also includes lens distortion-correcting unit 81, view point-converting unit 82, display area-trimming unit 83, synthesizing unit 84, and reference height-converting unit 85.

Preferably, further, the memory 13 suitably stores a variety of Look-Up Tables (LUTs) that act at least as the image-converting unit 14.

In addition, in further preferred embodiments, the apparatus of the present invention can suitably include obstacle-detecting unit 12, which preferably detects three-dimensional bodies such as a human or an object present in a bird's eye view area around the vehicle.

Preferably, the obstacle-detecting unit 12 may include an infrared sensor or an ultrasonic sensor, or be suitably implemented with a piece of software using photographed images.

In addition, in further preferred embodiments of the invention, the apparatus of the present invention can optionally include the control switch 16. Preferably, the control switch 16 can change a display mode of the display unit in response to the driver's operation, which will be described herein in other further embodiments of the present invention.

Figure 3:
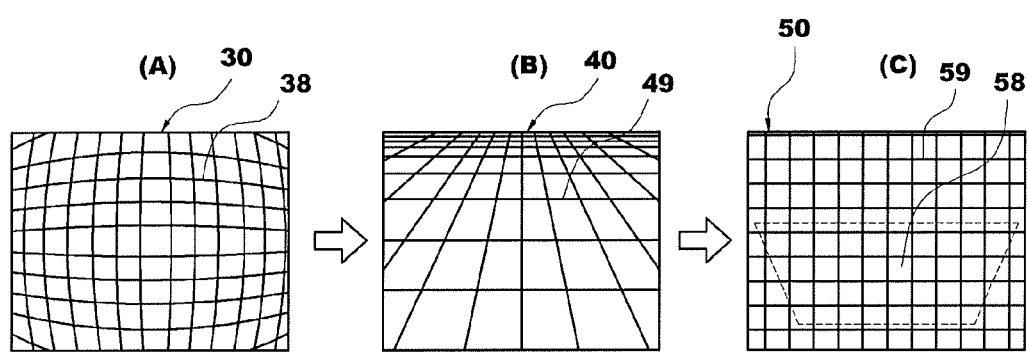
FIG. 3 illustrates an example of lens distortion correction and view point conversion in image conversion processed by image-converting unit, in which FIG. 3 (A) is an original photographed image, FIG. 3 (B) is an image after lens distortion correction, and FIG. 3 (C) is an image after view point conversion.

According to other preferred embodiments of the invention, for example as shown in FIG. 3, FIG. 3 illustrates an example of lens distortion correction and view point conversion in image conversion suitably processed by the image-converting unit 14.

According to certain exemplary embodiments, FIG. 3 (A) is an original image 30 suitably photographed by an on-vehicle camera having a wide angle lens. Preferably, the original image 30 has a distorted shape with the enlarged central area and the constricted edges as indicated with dotted grid lines 38.

According to other certain exemplary embodiments, FIG. 3 (B) is an image 40 which was subjected to lens distortion correction by the lens distortion-correcting unit 81 of the image-converting unit 14.

Preferably, in the lens distortion correction, pixel coordinate conversion is suitably performed using a dedicated LUT stored in the memory 13.

According to further preferred embodiments, and as indicated by lengthwise and breadthwise imaginary coordinate lines 49 on a road 5, the image 40 after lens distortion correction is in a shape that is suitably corrected according to the perspective drawing of a camera provided on a side portion (of front, rear and side portions) of the vehicle. According to certain further embodiments, notice, for example, that the lattice lines 38 and the coordinate lines 49 are generally different.

According to certain exemplary embodiments, FIG. 3 (C) is a road image 50 which was preferably subjected to view point conversion by the view point-converting unit 82 of the image-converting unit 14. Preferably, after the view point conversion, the view point of the road image 50 is suitably converted from the side view to the top view of the vehicle, and the imaginary coordinate lines 49 are suitably converted into imaginary rectangular coordinate lines 59 on the road 5.

Preferably, in this view point conversion, pixel coordinate conversion is suitably performing using a dedicated LUT stored in the memory 13.

According to other further preferred embodiments, a display area 58 enclosed by a dotted line corresponds to a display area subjected to trimming, as described in preferred embodiments of the present invention herein.

Figure 4:
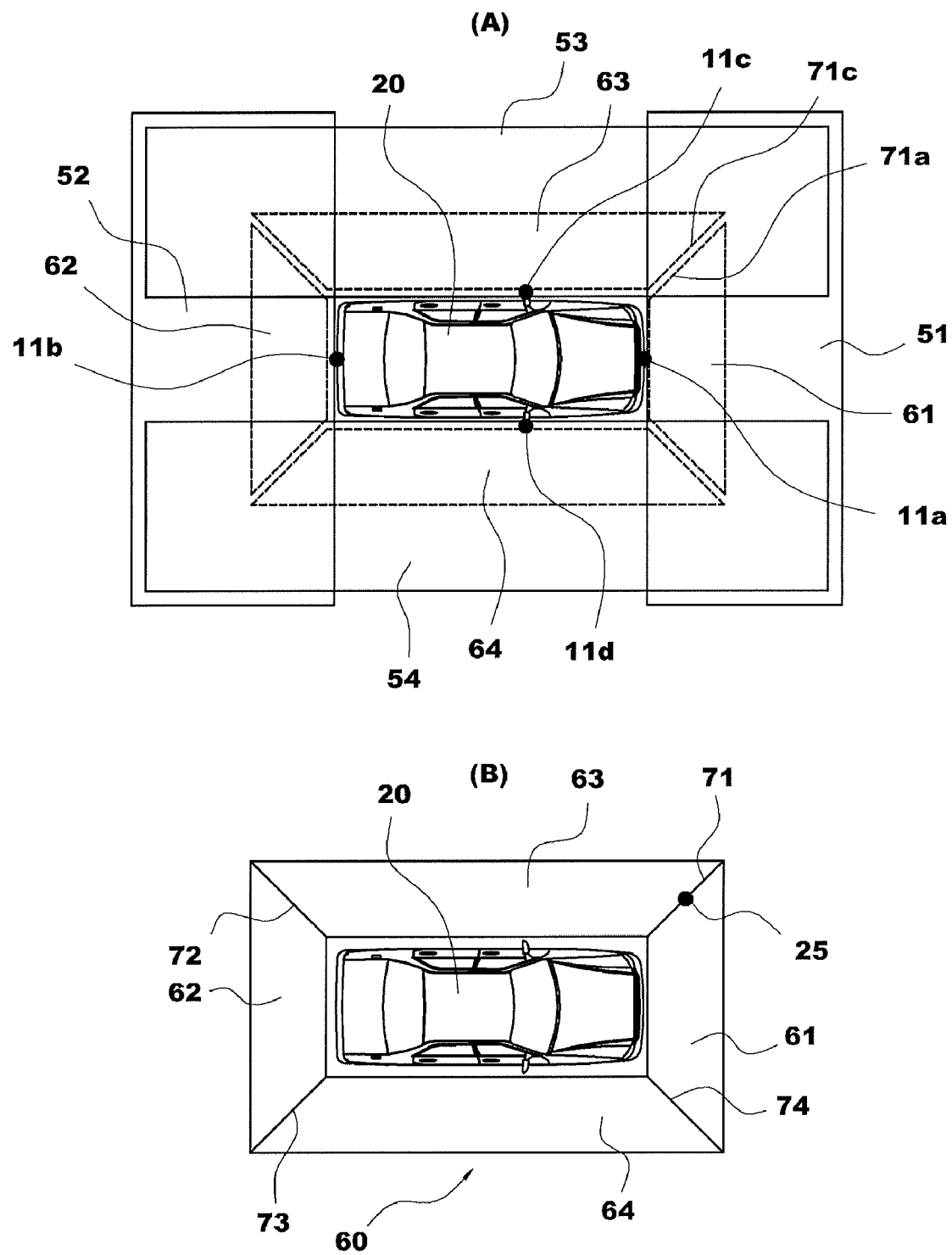
FIG. 4 is an example of drawing a bird's eye view image of around a vehicle seen from above, in which FIG. 4 (A) and (B) illustrate a bird's eye view image obtained by synthesizing four (4) side images, which has been subjected to view point conversion, with figures arranged on front, rear and sides of the vehicle.

According to preferred embodiments, and as shown in FIG. 4, FIG. 4 is an example of drawing a bird's eye view image around a vehicle seen from above.

According to certain exemplary embodiments, FIG. 4 (A) illustrates an exemplary display area trimming process by the display area-trimming unit 83 of the image-converting unit 14.

Preferably, FIG. 4 (A) is suitably obtained by converting original images photographed by four (4) cameras 11a to 11d in front, rear and side portions according to one view point, i.e., a top view point, and then suitably arranging resultant road images 51 to 54, obtained by the view point conversion, around a vehicle 20. Preferably, the road images 51 to 54 are displaced a little to clearly show display areas 61 to 64, each of which is trimmed.

According to certain exemplary embodiments, FIG. 4 (B) illustrates an image, i.e., in this case, a bird's eye view image 60 drawn by the synthesizing unit 84 of the image-converting unit 14.

Preferably, the display areas 61 to 64 shown in FIG. 4 (A) are suitably synthesized in such a fashion that adjacent boundaries (e.g., boundaries 71a and 71c) preferably adjoin each other.

Accordingly, in FIG. 4 (B), a seam 71 can be suitably obtained by bringing the boundaries 71a and 71c into contact with each other, and seams 72 to 74 can be suitably obtained in the same manner.

Further, although it will not be described in detail herein, according to other preferred embodiments of the present invention, the images in the trimmed display areas 61 to 64 generally have different levels of brightness on or around a suitable boundary, particularly, between adjacent display areas. In certain exemplary embodiments, for example in the case of synthesis, smoothing (or blending) is preferably performed on or around the seams 71 through 74 using information on the overlapping areas of images 51 through 54 shown in FIG. 4 (A) in order to suitably reduce the difference in brightness.

According to the present invention as described herein, the apparatus for displaying a bird's eye view image around a vehicle as described above generally performs synthesis based on the road (i.e., the ground level) on which the vehicle is preferably placed. According to preferred exemplary embodiments, this is for expressing the bird's eye view image in such a manner that the positional relationship between the vehicle and traffic signs, such as, for example, a white lane on the road and a white line around a parking area can be suitably discerned in the bird's eye view image. Accordingly, in exemplary embodiments of the present invention, an image can be suitably provided of the white line around the parking area when the vehicle is being parked or when it is being driven or is passing another vehicle on a narrow road.

According to other certain exemplary embodiments, for example as shown in FIG. 4 (B), a three-dimensional obstacle 25 present on or around a seam of a synthesized image is suitably obtained on the basis of an original image that is preferably photographed by a camera and the preciseness of the ensuing image conversion. However, according to further embodiments of the present invention, the image may not be suitably continuously connected at the seam, and in some cases, may be abnormally deformed to be displayed in a "completely fallen" state or in other further embodiments may not displayed at all.

Figure 5:
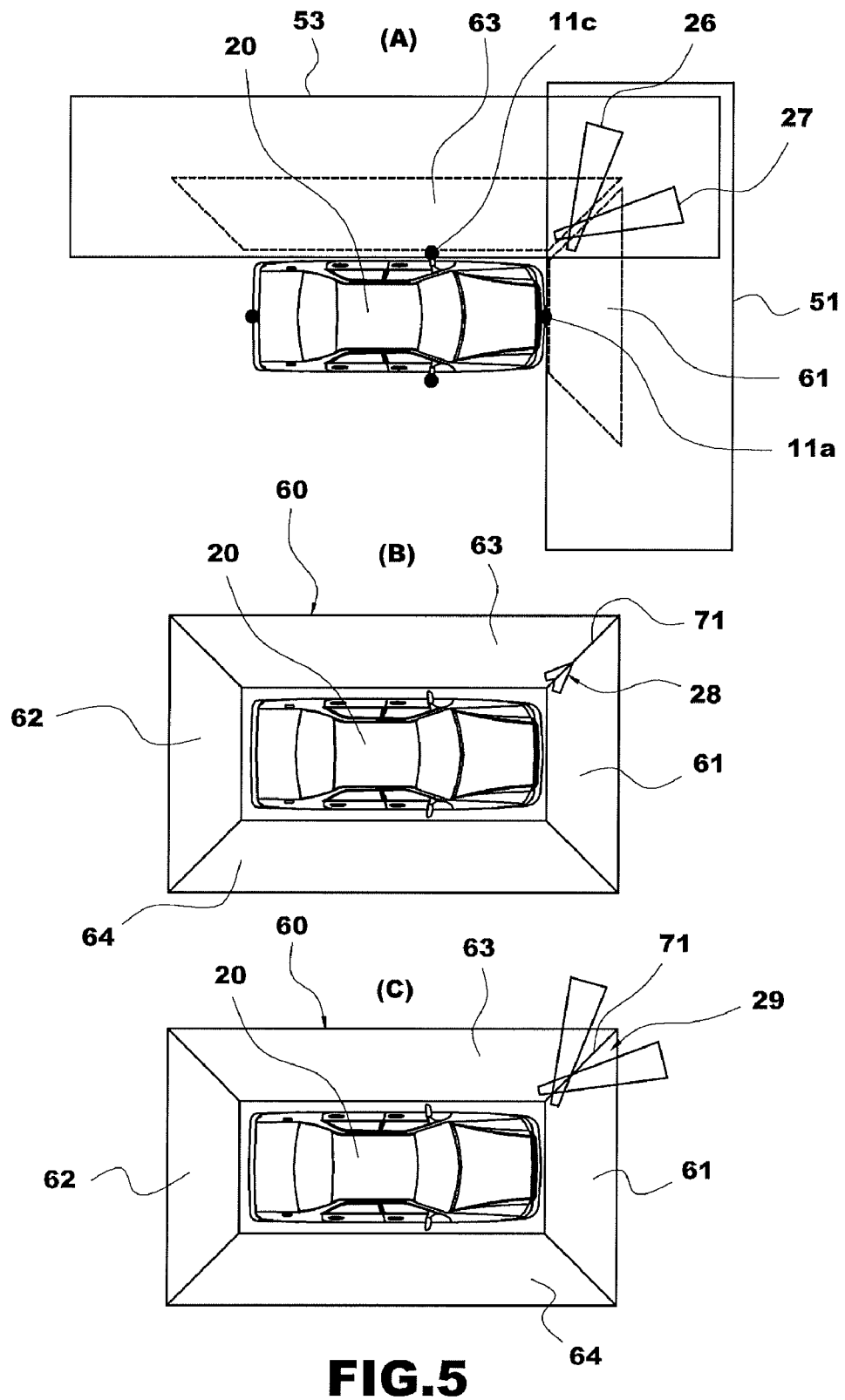
FIG. 5 (A) illustrates an image extracted when a three-dimensional obstacle is placed adjacent to the left front of a vehicle, FIG. 5 (B) illustrates a method for processing a bird's eye view image of around a vehicle according to the related art, and FIG. 5 (C) illustrates another method for processing a bird's eye view image of around a vehicle according to the related art.

According to other exemplary embodiments, for example with reference to FIG. 5, the three-dimensional obstacle 25 is preferably a column-shaped object in the left front of the vehicle. Preferably, the same process can be provided when a three-dimensional obstacle is suitably placed in a different position, and also in the case of a three-dimensional body other than one which is column-shaped, particularly, a human.

According to certain exemplary embodiments, for example as shown in FIG. 5, FIG. 5 (A) illustrates related images that are suitably extracted when the three-dimensional obstacle 25 is preferably placed in the state shown in FIG. 4 (A). Preferably, in the front and left road images 51 and 53 (after the view point conversion), the three-dimensional obstacle 25 is suitably displayed as three-dimensional obstacle images 26 and 27, which extend to the left and to the front (in the figure), respectively.

FIG. 5 (B) illustrates another exemplary embodiment of the present invention. FIG. 5(B) illustrates the bird's eye view image 60 when only the typically-trimmed display areas 61 to 64 are used. Preferably, in this case, a synthesized three-dimensional image 28 is suitably displayed as a sum of the three-dimensional obstacle images 26 and 27 respectively included in the display areas 61 and 63. According to further preferred embodiments, the synthesized three-dimensional image causes, for example, discontinuance, abnormal deformity, loss and the like to the seam, and accordingly, in further related embodiments, it is difficult to properly perceive the obstacle.

According to certain exemplary embodiments, for example as shown in FIG. 5(C), FIG. 5 (C) is a case where the two three-dimensional images 26 and 27 are suitably displayed as a synthesized three-dimensional obstacle image 29 by preferably overlapping them without correction.

Accordingly, FIG. 5 (C) can suitably reduce the danger of overlooking the synthesized three-dimensional obstacle image 29. However, it may be difficult for a driver or an occupant to suitably promptly perceive a human or a column from the "completely-fallen scissor-shaped" synthesized three-dimensional obstacle image 29.

Accordingly, the present invention has been devised to properly cope with such problems, based on a concept that the road image 50 includes not only information on the road (i.e., a first reference height) but also information on a limited reference height about an object that is perceived as a three-dimensional obstacle.

Accordingly, in further preferred embodiments, the reference height-converting unit 85 of the image-converting unit 14 of the present invention, in synthesizing a bird's eye view image, preferably sets a plurality of reference heights (i.e., an n+1 number of reference heights) including a first reference height 1 corresponding to the existing ground level, a reference height 2 higher than the ground level, a reference height 3 higher than the reference height 2, . . . , and a reference height n+1 higher than a reference height n (where n is an integer greater than 0), further sequentially converts the reference heights, and further allocates the converted reference heights to the display area-trimming unit 83 and the synthesizing unit 84, and suitably synthesizes a bird's eye view image corresponding to from the first to n+1$^{TH}$ heights.

Preferably, the process of converting and displaying the bird's eye view image obtained as above is automatically executed at predetermined time intervals.

In further preferred embodiments of the present invention, for example in the case where the control switch 16 is optionally provided, when the driver of the vehicle 20 suitably perceives the synthesized three-dimensional image 28 on the seam from the bird's eye view image 60 displayed on the display unit 15, the driver can manually start the reference height-converting unit 85 by operating the control switch 16.

Further, in the case where the obstacle-detecting unit 12 is optionally provided as described above, when the obstacle-detecting unit 12 detects the synthesized three-dimensional image 28 on the seam of the bird's eye view image 60, the reference height-converting unit 85 is automatically started. Preferably, in further related embodiments, the control switch 16 is not required.

According to further exemplary embodiments, and describing the reference heights in more detail, for example, the reference height 1 is set to the Ground Level (GL), the reference height 2 is set to 15 cm from ground level, and the reference height 3 is set to 30 cm from ground level. However, it is to be understood that these are not intended to limit the present invention.

Described herein is a case where a three-dimensional obstacle is placed adjacent to the left front seam according to a preferred exemplary embodiment of the present invention.

Figure 6:
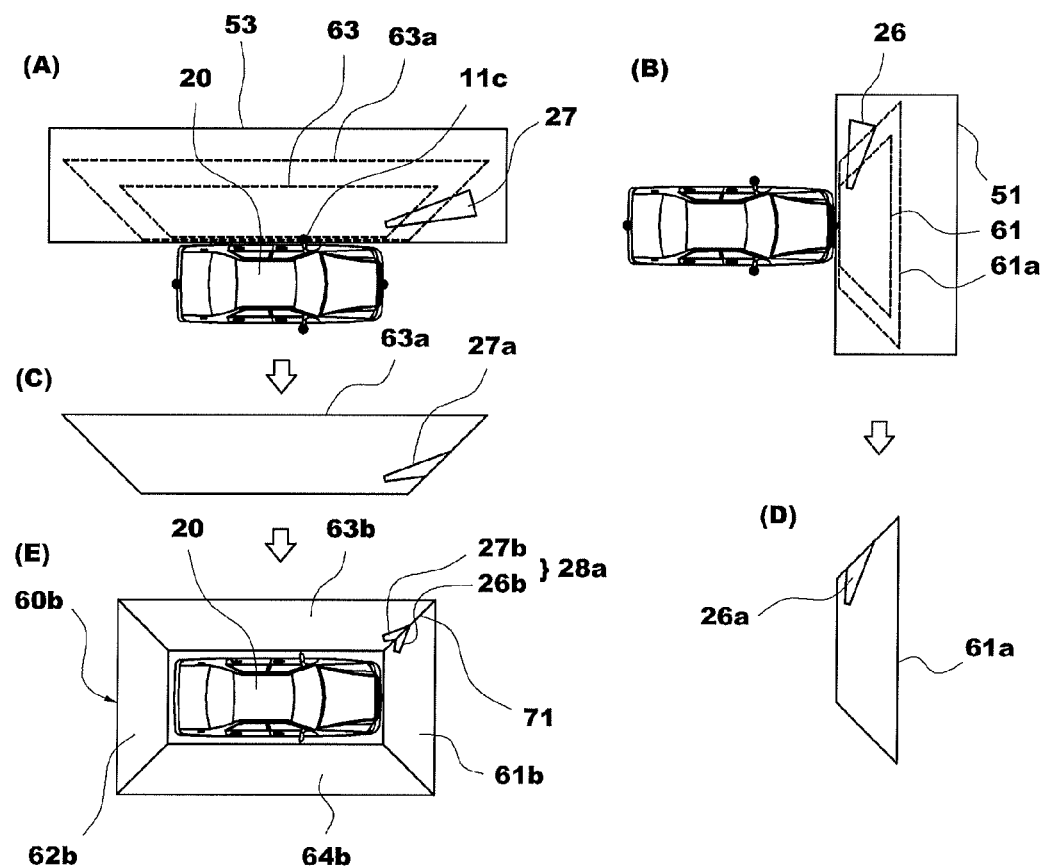
FIG. 6 (A) through (E) illustrate a method for processing a bird's eye view image of around a vehicle in accordance with one exemplary embodiment of the present invention when a three-dimensional obstacle is placed adjacent to the left front of the vehicle shown in FIG. 4.

According to other embodiments, for example as shown in FIG. 6 (A) and (B), as previously described herein, the three-dimensional obstacle images 27 and 26 appear on the left and front road images 53 and 51 after view point conversion, and are suitably partially included in the display areas 63 and 61, respectively.

Preferably, when the display area-trimming unit 83 of the present invention suitably trims the road images 53 and 51 according to the ground level (i.e., the first reference height), the display areas 63 and 61 (and 62 and 64 respectively) as described herein can be suitably obtained. According to further preferred embodiments, when the road images 53 and 51 are suitably trimmed according to a level higher than the ground level (e.g., the second reference height), display areas 63a and 61a (and 62b and 64b respectively) are obtained. Further, as shown in exemplary FIG. 6, FIG. 6 (C) and (D) are suitably obtained by separating the display areas 63a and 61a (and 62b and 64b respectively).

According to preferred embodiments of the invention, in general, the ranges of the display areas 63a and 61a are suitably wider than those of the display areas 63 and 61 according to the reference height, and the sum of the partial images 27a and 26a of the three-dimensional obstacle inside the display areas 63a and 61a is suitably wider than the synthesized three-dimensional image 28 obtained by synthesizing partial images of the three-dimensional obstacle inside the display areas 63 and 61 (see FIG. 5 (B).

Preferably, the display area-trimming unit 83 of the present invention converts the trimmed display areas 63a and 61a into display areas 63b and 61b by suitably reducing the display areas 63a and 61a in such a fashion that the positions of respective pixels on the ground level become identical with those of the display areas 63 and 61. (The outline of the display areas 63b and 61b are identical with the display areas 63 and 61.) In further related embodiments, the synthesizing unit 84 of the present invention suitably synthesizes the display areas 63b and 61b, thereby producing a bird's eye view image 60b for the reference height 2 as shown in FIG. 6 (E).

According to certain exemplary embodiments, for example as shown in FIG. 6 (E), partial images 27b and 26b of the three-dimensional obstacle are substantially in contact with the seam 71 (that is, within an error range according to the image conversion), and a "pine needle-shaped" synthesized three-dimensional image 28a is suitably produced by synthesizing the partial obstacle images 27b and 26b. The "pine needle-shaped" synthesized three-dimensional image 28a is still greater than the synthesized three-dimensional image 28 at the reference height 1 and is rarely lost from view. Accordingly, in preferred exemplary embodiments of the present invention, the synthesized three-dimensional image 28a can easily perceived as an obstacle.

Figure 7:
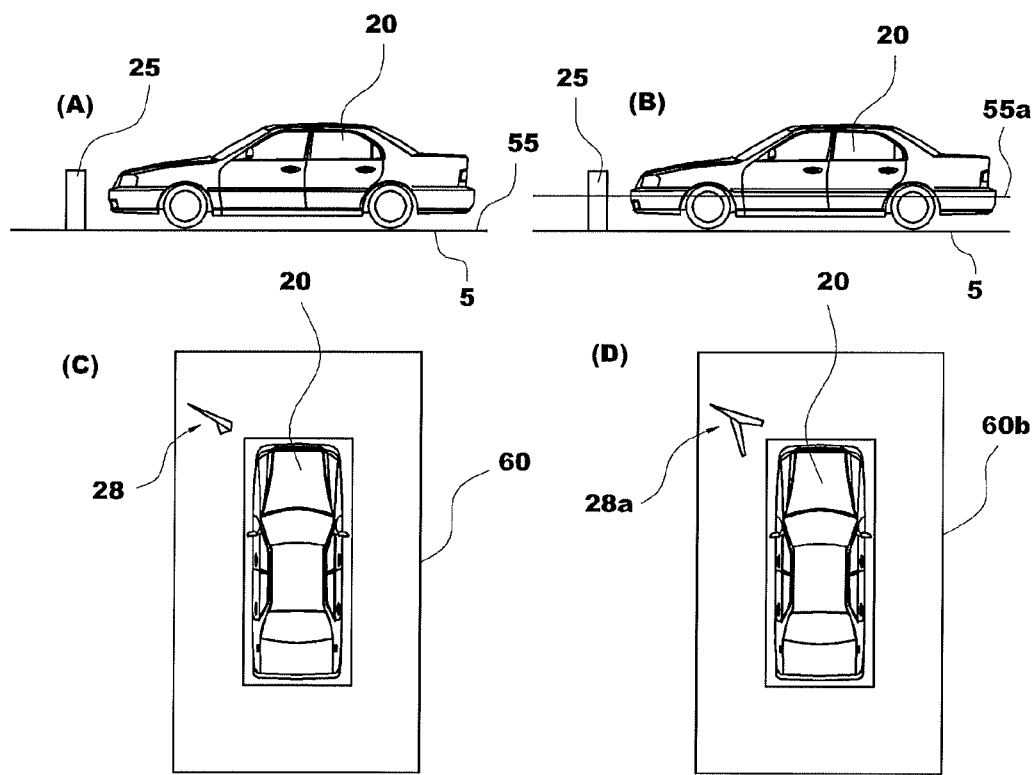
FIG. 7 (A) through (D) are exemplary illustrations of a method for processing a bird's eye view image of around a vehicle in accordance with one exemplary embodiment of the present invention and its effects when a three-dimensional obstacle is placed adjacent to the left front of the vehicle shown in FIG. 4.

According to certain exemplary embodiments, and as shown in FIG. 7, FIG. 7 illustrates a concept of the present invention based on the above description, in which FIG. 7 (A) shows a case where the reference height is preferably a first reference height 55, which is the level of the ground 5, FIG. 7 (B) shows a case where the reference height is preferably a second reference height 55a, which is a limited reference height, and FIG. 7 (C) and (D) are bird's eye view images corresponding to FIG. 7 (A) and (B), respectively.

Preferably, driver's perceptibility of the three-dimensional obstacle can be more enhanced by alternately displaying FIG. 7 (C) and (D).

In further preferred embodiments, driver's perception of the three-dimensional obstacle can preferably be enhanced by alternately displaying different bird's eye view images that suitably correspond to at least three reference heights.

A method for displaying a bird's eye view image of around a vehicle in accordance with another exemplary embodiment of the present invention preferably includes the steps of: photographing surrounding objects of a vehicle using a plurality of on-vehicle cameras, suitably converting surrounding images into a bird's eye view image, and suitably displaying the bird's eye view image to a driver or an occupant on an on-vehicle display unit.

Preferably, the step of converting surrounding images includes correcting lens distortion in each of the photographed images, suitably converting a view point, suitably trimming display areas, and suitably synthesizing the bird's eye view image by connecting the trimmed display areas.

Accordingly, the step of converting surrounding images also preferably includes converting a reference height in which first through $n+1^{TH}$ bird's eye view images are produced by sequentially drawing bird's eye view images for the ground level (i.e., the first reference height) and the second through $n+1^{TH}$ reference heights (where n is an integer greater than 0) higher than the ground level.

Figure 8:
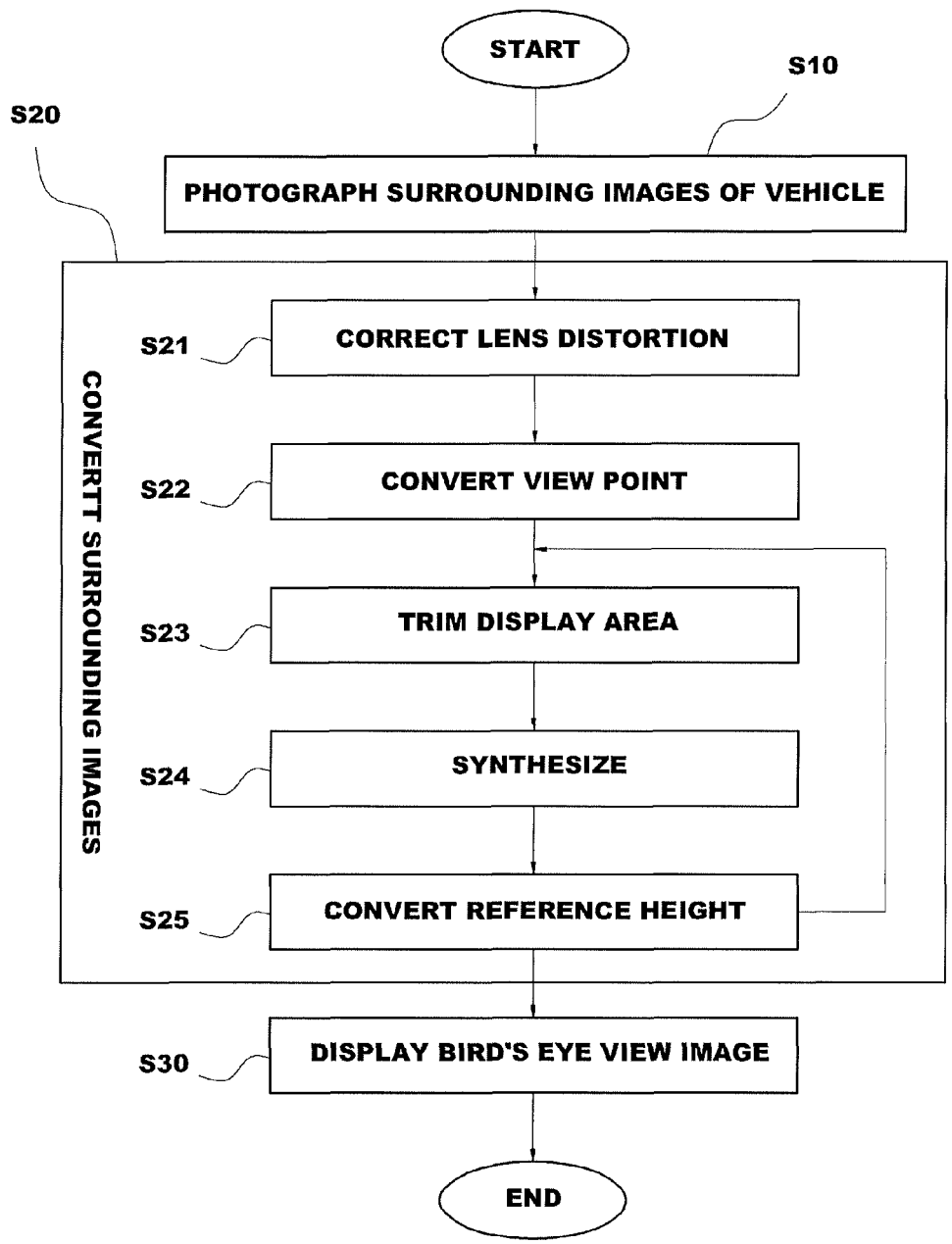
FIG. 8 is a flowchart illustrating a preferred method for displaying a bird's eye view image of around a vehicle in accordance with one exemplary embodiment of the present invention.

According to certain exemplary embodiments, and as shown in FIG. 8, FIG. 8 is a flowchart illustrating a preferred method for displaying a bird's eye view image of around a vehicle in accordance with another exemplary embodiment of the present invention.

Preferably, according to certain preferred embodiments, the method of the present invention includes the steps of: photographing surrounding images of a vehicle using a plurality of on-vehicle cameras (S10), suitably converting the surrounding images into a bird's eye view image (S20), and suitably displaying the bird's eye view image to a driver or an occupant on an on-vehicle display unit (S30).

Preferably, the step S20 of converting surrounding images includes suitably correcting lens distortion in each of the photographed images (S21), suitably converting a view point (S22), suitably trimming display areas (S23), suitably synthesizing the bird's eye view image by connecting the trimmed display areas (S24), and suitably converting a reference height (S25).

According then to further related embodiments, among these steps, the step S10 of converting surrounding images, the converting step S21 through the synthesizing step S24, and the displaying step S30 substantially overlap those previously described herein in the embodiment of the apparatus for displaying a bird's eye view image of around a vehicle, and thus have already been sufficiently described.

In certain preferred embodiments, the reference height-converting step S25 suitably determines the reference height of the bird's eye view image synthesized in S24, so that the determined reference height is suitably output in the displaying step S30, converts the reference height, and returns to the trimming step S23. Accordingly, in this fashion, in addition to the first bird's eye view image corresponding to ground level (i.e., the first reference height), the second through $n+1^{TH}$ bird's eye view images corresponding to the second through $n+1^{TH}$ reference heights (where n is an integer greater than 0), which are sequentially higher than the ground level, are sequentially drawn.

While the present invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. An apparatus for displaying a bird's eye view image, comprising:
   a plurality of on-vehicle cameras photographing surrounding objects of a vehicle;
   an image-converting unit wherein the image converting unit processes images obtained by the on-vehicle cameras, corrects lens distortion in each of images photographed by the on-vehicle cameras, converts a view point, trims display areas, and synthesizes a bird's eye view image around the vehicle by connecting the trimmed display areas; and
   an on-vehicle display unit displaying the synthesized bird's eye view image to a driver or an occupant, wherein the image-converting unit produces first through n+1$^{TH}$ bird's eye view images by sequentially drawing the second through n+1$^{TH}$ bird's eye view images for second through n+1$^{TH}$ reference heights, which are sequentially higher than ground level indicated by a first reference height, when a three-dimensional obstacle placed adjacent to a seam is suitably detected from a bird's eye view image of around the vehicle, where n is an integer greater than 0, in addition to drawing the bird's eye view image for the ground level, and once the view point is converted, converts a view point of an image from a side view to a top view of the vehicle, and wherein image converting unit,
- converts the distortion-corrected image into an image seen from above the vehicle with reference to a view point-correcting look-up table,
- trims first through n+1$^{TH}$ display areas from the view point-converted image with reference to first through n+1$^{TH}$ display area-trimming look-up tables corresponding to the first through n+1$^{TH}$ reference heights, the first through n+1th reference heights including a first reference height 1 corresponding to the ground level and a reference height n+1 higher than the ground level, further sequentially converts the reference heights, and
- synthesizes the first through n+1$^{TH}$ bird's eye view images by connecting the first through n+1$^{TH}$ display areas.

2. The apparatus in accordance with claim 1, wherein in the image-converting unit corrects a distortion due to a wide angle lens by referring to a lens distortion-correcting look-up table.

3. The apparatus in accordance with claim 1, further comprising a sensor detecting a three-dimensional obstacle around the vehicle,
wherein the first bird's eye view image is configured to be displayed while not detecting a three-dimensional obstacle that is placed on at least one seam (of the bird's eye view image by the sensor, and the reference height-converting unit is activated when the sensor detects a three-dimensional obstacle placed on at least one seam of the bird's eye view image.

4. The apparatus in accordance with claim 1, further comprising a control switch changing a display mode of the bird's eye view image in response to an operation of the driver,
wherein the first bird's eye view image is configured to be displayed while not perceiving a three-dimensional obstacle that is placed on at least one seam of the bird's eye view image by the driver, and a reference height-converting unit is activated when the presence of the three-dimensional obstacle is perceived by the driver and the driver operates the control switch.

5. The apparatus in accordance with claim 1, further comprising:
a sensor configured to detect a three-dimensional obstacle around the vehicle; and
a control switch configured to change a display mode of the bird's eye view image in response to an operation of the driver,
wherein the first bird's eye view image is displayed when a presence of the three-dimensional obstacle on at least one seam of the bird's eye view image is detected neither by the sensor nor by the driver, and the reference height-converting unit is started when the presence of the three-dimensional obstacle is detected by the sensor or when the presence of the three-dimensional obstacle is detected by the driver and the control switch is operated by the driver.

6. A motor vehicle comprising an apparatus for displaying a bird's eye view image of claim 1.

7. A method for displaying a bird's eye view image, comprising:
photographing surrounding objects of a vehicle using a plurality of on-vehicle cameras;
converting an image, wherein the image conversion includes correcting lens distortion in each of the images photographed by the on-vehicle cameras, converting a view point, trimming display areas, and synthesizing and drawing a bird's eye view image around the vehicle by connecting the trimmed display areas;
displaying the bird's eye view image to a driver or an occupant using an on-vehicle display unit,
wherein the image conversion includes converting reference heights to produce first through n+1$^{TH}$ bird's eye view images by sequentially drawing the second through n+1$^{TH}$ bird's eye view images for second through n+1$^{TH}$ reference heights, which are sequentially higher than ground level indicated by a first reference height, when a three dimensional obstacle placed adjacent to a seam is suitably detected from the bird's eye view image of around the vehicle, where n is an integer greater than 0, in addition to drawing the bird's eye view image for the ground level and when the view point is converted, converts a view point of an image from a side view to a top view of the vehicle, and
wherein image converting unit,
- converts the distortion-corrected image into an image seen from above the vehicle with reference to a view point-correcting look-up table,
- trims first through n+1$^{TH}$ display areas from the view point-converted image with reference to first through n+1$^{TH}$ display area-trimming look-up tables corresponding to the first through n+1$^{TH}$ reference heights, the first through n+1$^{TH}$ reference heights including a first reference height 1 corresponding to the ground level and a reference height n+1 higher than the ground level, further sequentially converts the reference heights, and
- synthesizes the first through n+1$^{TH}$ bird's eye view images by connecting the first through n+1$^{TH}$ display areas.

* * * * *